(12) United States Patent
Nakayama et al.

(10) Patent No.: US 11,548,148 B2
(45) Date of Patent: Jan. 10, 2023

(54) ROBOT CONTROL DEVICE (71) Applicant: FANUC CORPORATION, Yamanashi (JP)

(72) Inventors: Kazutaka Nakayama, Yamanashi (JP); Kenichiro Oguri, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 151 days.

(21) Appl. No.: 16/720,398

(22) Filed: Dec. 19, 2019

(65) Prior Publication Data
US 2020/0246969 A1 Aug. 6, 2020

(30) Foreign Application Priority Data

Jan. 31, 2019 (JP) .............................. JP2019-015405

(51) Int. Cl.
B25J 9/16 (2006.01)

(52) U.S. Cl.
CPC ............ B25J 9/1638 (2013.01); B25J 9/161 (2013.01); B25J 9/1607 (2013.01)

(58) Field of Classification Search
CPC ......... B25J 9/1638; B25J 9/1607; B25J 9/161
See application file for complete search history.

(56) References Cited

U.S. PATENT DOCUMENTS

| 2002/0173878 | A1  | 11/2002 | Watanabe et al. |                |
|--------------|-----|---------|-----------------|----------------|
| 2014/0035306 | A1* | 2/2014  | Garcia          | B25J 15/0085   |
|              |     |         |                 | 294/213        |
| 2015/0258685 | A1* | 9/2015  | Matsumoto       | B25J 9/1633    |
|              |     |         |                 | 700/261        |
| 2016/0039092 | A1* | 2/2016  | Harada          | B25J 9/1679    |
|              |     |         |                 | 901/41         |
| 2016/0297069 | A1* | 10/2016 | Negishi         | B25J 9/1638    |
| 2017/0028554 | A1* | 2/2017  | Gomi            | B25J 13/088    |
| 2018/0243916 | A1* | 8/2018  | Hashimoto       | B25J 18/00     |

FOREIGN PATENT DOCUMENTS

| EP | 1250986     | A2 | 10/2002 |
|----|-------------|----|---------|
| JP | 2000-042961 | A  | 2/2000  |
| JP | 2002307344  | A  | 10/2002 |
| JP | 3808321     | B2 | 8/2006  |
| JP | 2009075045  | A  | 4/2009  |
| JP | 2012-061545 | A  | 3/2012  |
| JP | 2016036858  | A  | 3/2016  |
| JP | 2018030190  | A  | 3/2018  |

OTHER PUBLICATIONS

Japanese Office Action dated Mar. 23, 2021, in connection with corresponding JP Application No. 2019-015405 (5 pp., including machine-generated English translation).

* cited by examiner

Primary Examiner — Khoi H Tran
Assistant Examiner — Aaron G Cain
(74) Attorney, Agent, or Firm — Maier & Maier, PLLC (57) ABSTRACT A robot control device includes: a creep-information storage unit that stores an amount of bending in correspondence with a cumulative time, the bending occurring in a robot due to creep deformation; a mastering-data storage unit that stores mastering data of the robot; a timer that measures the cumulative time; and a correction unit that corrects the mastering data stored in the mastering-data storage unit based on the amount of bending stored in the creep-information storage unit in correspondence with the cumulative time measured by the timer.

6 Claims, 9 Drawing Sheets

| ELAPSED TIME | AMOUNT OF BENDING |
|---|---|
|  |  |
|  |  |
|  |  |
|  |  |
|  |  |

| ELAPSED TIME | AMOUNT OF BENDING | | | | | |
|---|---|---|---|---|---|---|
| | 15°C | 20°C | 25°C | 30°C | 35°C | 40°C |
| | | | | | | |
| | | | | | | |
| | | | | | | |
| | | | | | | |

ROBOT CONTROL DEVICE

CROSS-REFERENCE TO RELATED APPLICATIONS

This application is based on Japanese Patent Application No. 2019-015405, the content of which is incorporated herein by reference.

FIELD

The present invention relates to robot control devices.

BACKGROUND

As robots are becoming lighter and lighter, it is desirable to reduce the effect on the accuracy of a robot caused by an increase in bending of a robot mechanical unit. A known robot control device achieves this by calculating bending occurring on a link on the basis of the kinematics of the robot, correcting bending of the entire robot, and positioning the robot to a target positional posture (e.g., see Japanese Patent No. 3808321).

SUMMARY

An aspect of the present invention provides a robot control device including: a creep-information storage unit that stores an amount of bending in correspondence with a cumulative time, the bending occurring in a robot due to creep deformation; a mastering-data storage unit that stores mastering data of the robot; a timer that measures the cumulative time; and a correction unit that corrects the mastering data stored in the mastering-data storage unit based on the amount of bending stored in the creep-information storage unit in correspondence with the cumulative time measured by the timer.

DETAILED DESCRIPTION OF EMBODIMENTS

Figure 1:
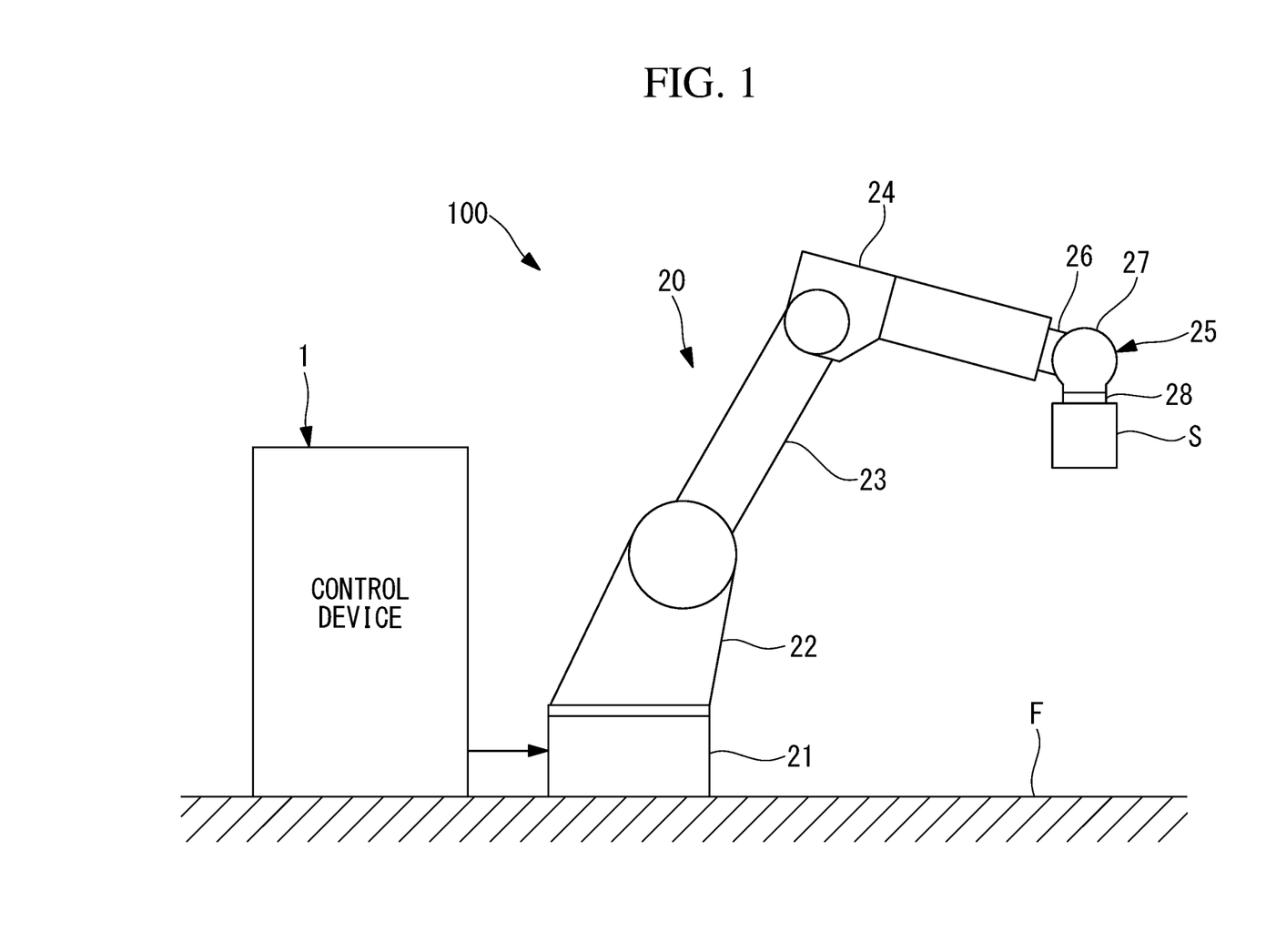
FIG. 1 schematically illustrates a robot system equipped with a robot control device according to an embodiment of the present invention.

A robot control device 1 according to an embodiment of the present invention will be described below with reference to the drawings. The robot control device 1 according to this embodiment is provided in a robot system 100 shown in FIG. 1. The robot system 100 includes, for example, a vertical articulated robot 20 and the robot control device 1 connected to the robot 20. The type of the robot 20 is not limited.

Figure 4:
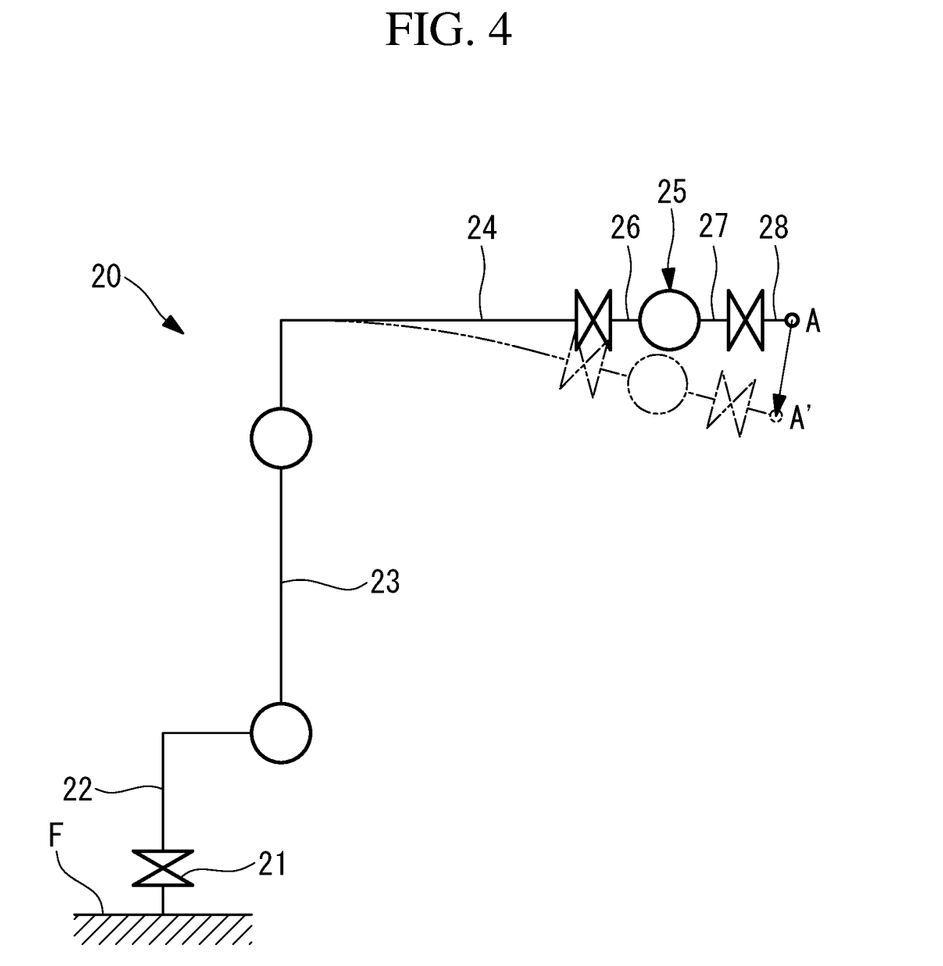
FIG. 4 schematically illustrates an example of creep deformation occurring in a robot included in the robot system in FIG. 1.

As shown in FIG. 4, the robot 20 includes a base 21 installed on a floor surface (installation surface) F, a rotating body 22 supported in a rotatable manner relative to the base 21 about a first vertical axis, a first arm 23 supported in a rotatable manner relative to the rotating body 22 about a second horizontal axis, a second arm 24 having a longitudinal axis and supported in a rotatable manner relative to the first arm 23 about a third horizontal axis, and a wrist unit 25 supported by the distal end of the second arm 24. In the drawings, reference sign S denotes a tool.

The wrist unit 25 includes, at the distal end of the second arm 24, a first wrist component 26 supported in a rotatable manner about a fourth axis extending along the longitudinal axis of the second arm, a second wrist component 27 supported in a rotatable manner relative to the first wrist component 26, and a third wrist component 28 supported in a rotatable manner relative to the second wrist component 27. The second wrist component 27 is supported in a rotatable manner relative to the first wrist component 26 about a fifth axis that is orthogonal to the fourth axis. The third wrist component 28 is supported in a rotatable manner relative to the second wrist component 27 about a sixth axis that is orthogonal to the fifth axis and that extends through an intersection point between the fourth axis and the fifth axis.

Figure 2:
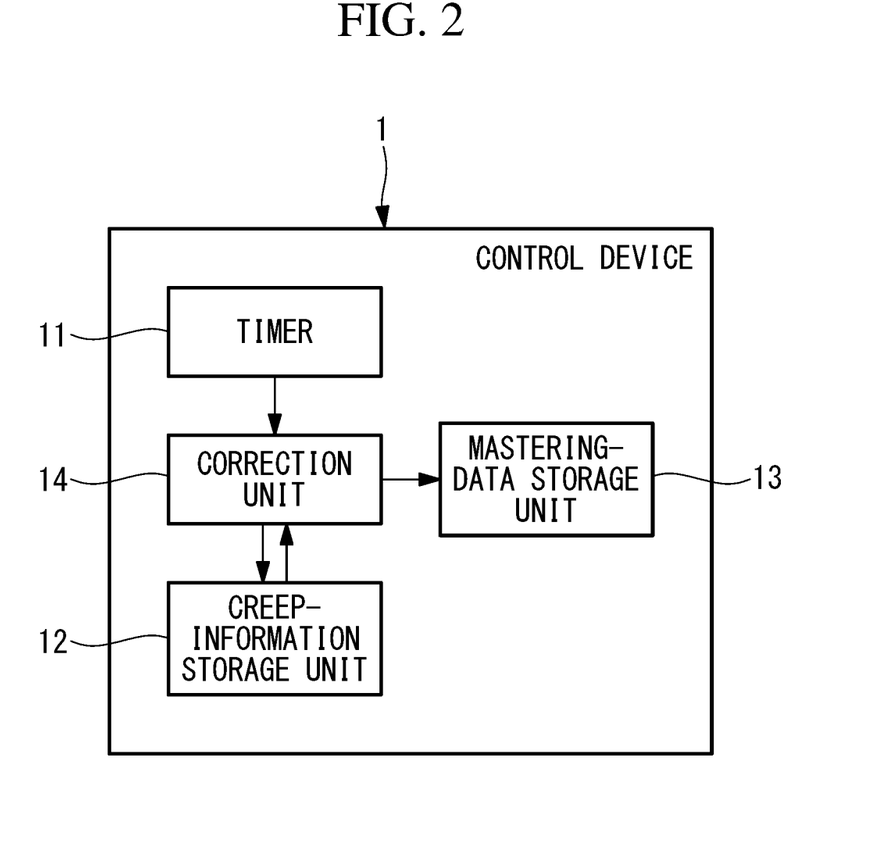
FIG. 2 is a block diagram illustrating the robot control device in FIG. 1.

As shown in FIG. 2, the robot control device 1 includes a timer 11, a creep-information storage unit 12 that stores creep information, a mastering-data storage unit 13 that stores mastering data of the robot 20, and a correction unit 14. The timer 11 is activated when the robot 20 is installed. The timer 11 measures the elapsed time from the installation and also outputs the measured elapsed time to the correction unit 14.

The mastering data indicates a value of an encoder that detects the rotational angle of each axis of the robot 20 when the robot 20 is disposed at the origin position. The mastering-data storage unit 13 stores, for example, mastering data generated as a result of a mastering process performed after the robot 20 is manufactured. By performing the mastering process on each robot 20, the distal end of the tool S can be disposed at a desired position even if the components constituting the robot 20 have dimensional errors due to individual differences.

Figure 3:
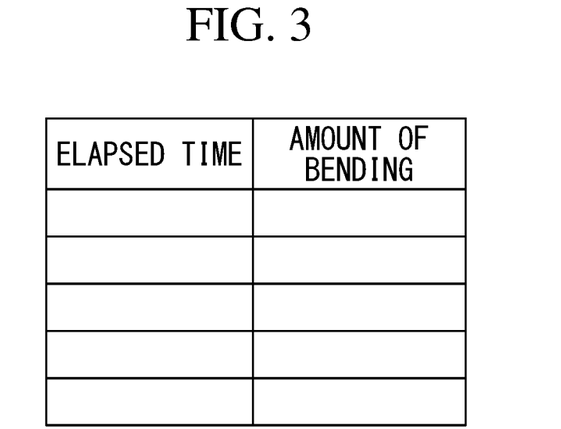
FIG. 3 illustrates a table showing an example of the elapsed time and the amount of bending stored in correspondence with each other in a creep-information storage unit included in the robot control device in FIG. 2.

As shown in FIG. 3, the creep-information storage unit 12 stores the amount of bending caused by creep deformation and the elapsed time (cumulative time) in correspondence with each other. The relationship between the amount of bending and the elapsed time may be acquired from tests performed in advance. The creep-information storage unit 12 stores the amount of bending and the elapsed time in correspondence with each other by using a table. As an alternative to a table, a map or an approximation expression may be used.

As shown in FIG. 4, in the robot 20, creep deformation occurs with time in the arms 23 and 24 that particularly receive gravity. For the sake of convenience, FIG. 4 illustrates a case where creep deformation occurs only in the second arm 24. In FIG. 4, a solid line indicates the posture of the robot 20 at the origin position before creep deformation occurs, and a single-dot chain line denotes the posture of the robot 20 at the origin position after creep deformation occurs. The amount of bending is indicated by a bend vector denoted by an arrow in FIG. 4.

When the arms 23 and 24 are composed of a lightweight material, such as plastic, bending tends to occur readily due to creep deformation. According to FIG. 4, the distal end of the tool S moves from the position indicated by reference sign A before creep deformation to the position indicated by reference sign A' after creep deformation.

Figure 5:
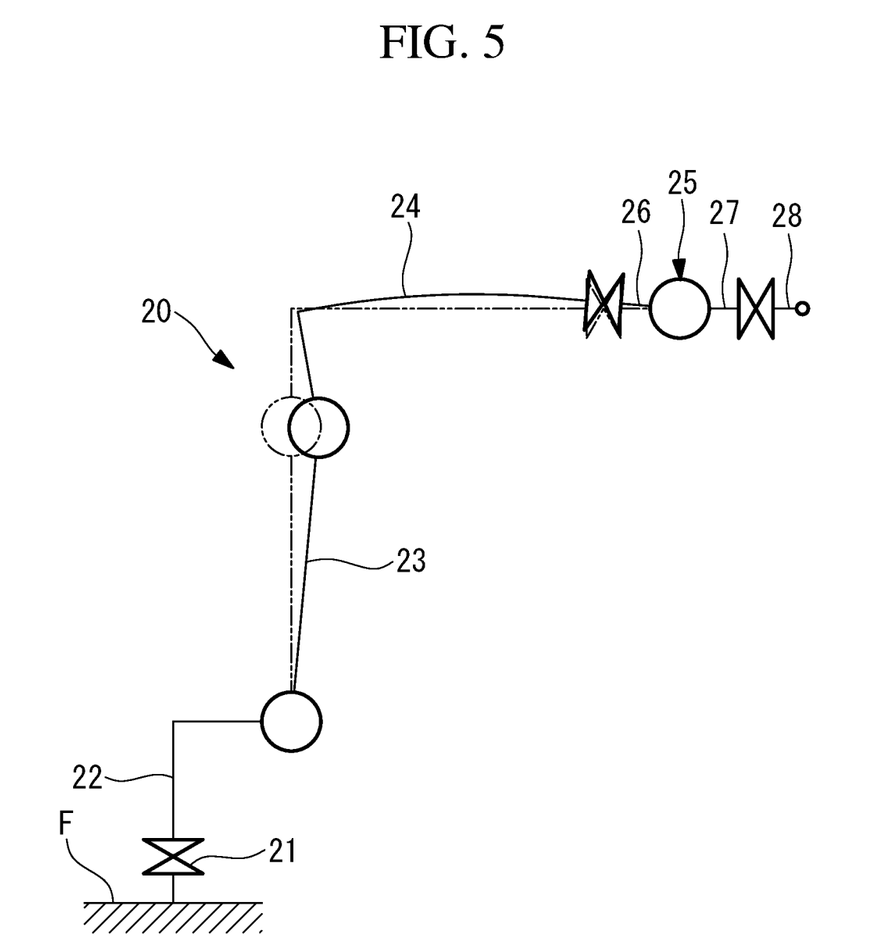
FIG. 5 schematically illustrates the posture of the robot at an origin position before and after mastering data is corrected by a correction unit of the robot control device in FIG. 1.

The correction unit 14 corrects the mastering data to correct the distal end of the tool S, which has moved to the position indicated by reference sign A' due to creep deformation, to the position indicated by reference sign A. In FIG. 5, a solid line indicates the posture of the robot 20 at the origin position after the mastering data is corrected, and a single-dot chain line indicates the posture of the robot 20 at the origin position before creep deformation occurs.

The correction unit 14 receives the elapsed time input from the timer 11 and reads the amount of bending stored in the creep-information storage unit 12 in correspondence with the elapsed time, at a predetermined time interval or where necessary. If the elapsed time and the amount of bending stored in correspondence with each other in the creep-information storage unit 12 are discrete pieces of data, the pieces of data may be stored, and the amount of bending may be calculated. The correction unit 14 is constituted by a processor.

The correction unit 14 corrects the mastering data by using the amount of bending read from the creep-information storage unit 12 and updates the mastering data stored in the mastering-data storage unit 13.

For example, in the example shown in FIG. 5, the angle of the first arm 23 relative to the rotating body 22 and the angle of the second arm 24 relative to the first arm 23 are changed by an angle necessary for moving the position of the center of the wrist serving as the intersection point between the fourth axis and the fifth axis after creep deformation back to the position after creep deformation. In this state, the angle of the second wrist component 27 relative to the first wrist component 26 about the fifth axis is also changed by an angle necessary for aligning the distal end of the tool S before creep deformation with the distal end of the tool S after creep deformation. Specifically, the correction unit 14 corrects the mastering data such that the posture in which the angle of each axis is changed relative to the posture before creep deformation matches the posture at the origin position after creep deformation.

Accordingly, in the robot control device 1 according to this embodiment, even if the amount of bending caused by creep deformation increases with time elapsed from installation, the correction unit 14 corrects the mastering data on a timely basis on the basis of the amount of bending stored in correspondence with the elapsed time. Consequently, the positional accuracy of the distal end of the working tool S serving as the origin point of the tool S can be favorably maintained without having to perform mastering again using, for example, a jig.

Figure 6:
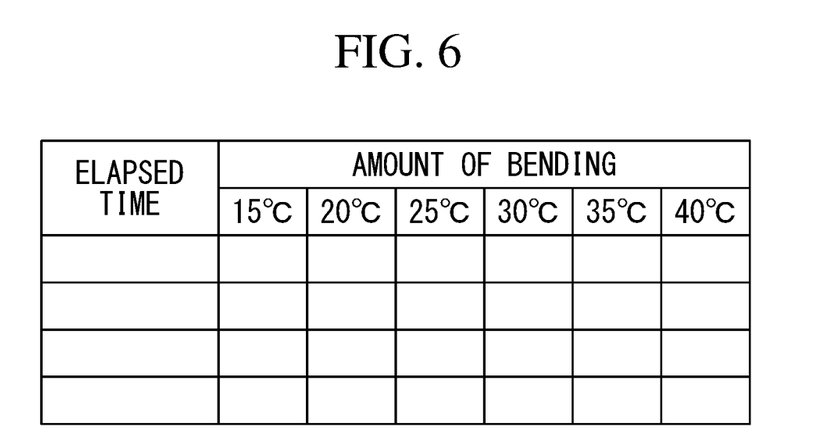
FIG. 6 illustrates a modification of the table in FIG. 3.

In the robot control device 1 according to this embodiment, the elapsed time and the amount of bending are stored in correspondence with each other in the creep-information storage unit 12. Alternatively, the elapsed time and the amount of bending may be stored in correspondence with each other for each operating environment temperature, as shown in FIG. 6. For example, if the robot 20 operates continuously in an environment where the operating environment temperature does not change, as in a clean room, the amount of bending corresponding to the elapsed time may be read from the relationship between the elapsed time and the amount of bending corresponding to the input operating environment temperature of the robot 20. The operating environment temperature may be input by an operator or may be detected by a thermometer provided in the robot control device 1.

Accordingly, the amount of bending caused by creep deformation and fluctuating in accordance with the operating environment temperature of the robot 20 is estimated more accurately, so that the mastering data can be corrected with higher accuracy. As an alternative to or in addition to the operating environment temperature, the operating environment humidity may be used.

If the robot 20 operates in an environment where the operating environment conditions, such as the operating environment temperature, the operating environment humidity, or the load acting on the robot 20, change, the timer 11 may measure the duration time and cumulative time of operation for each operating environment condition, and the correction unit 14 may calculate the cumulative amount of bending by integrating the increments of the amount of bending calculated on the basis of a temporal change in the amount of bending in the cumulative time measured by the timer 11 and the duration time measured by the timer 11 and may correct at least one of the mastering data and a mechanical parameter on the basis of the calculated cumulative amount of bending.

Figure 9:
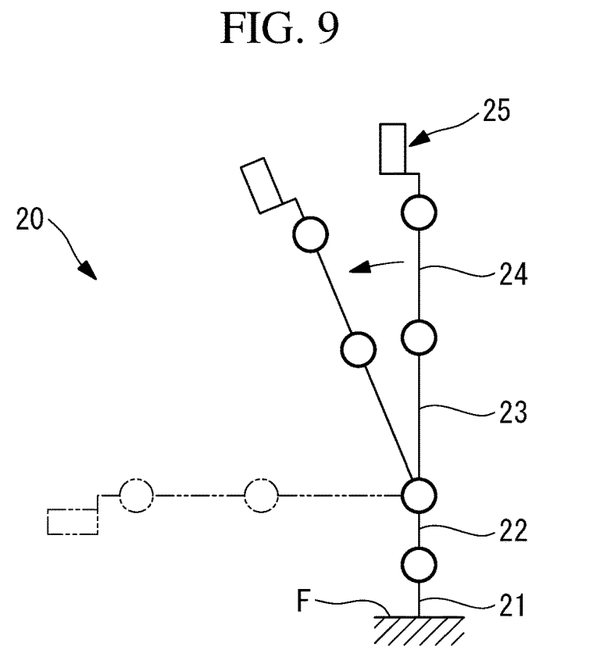
FIG. 9 schematically illustrates an operation where an inertial force alone acts on arms of the robot included in the robot system in FIG. 1.
Figure 10:
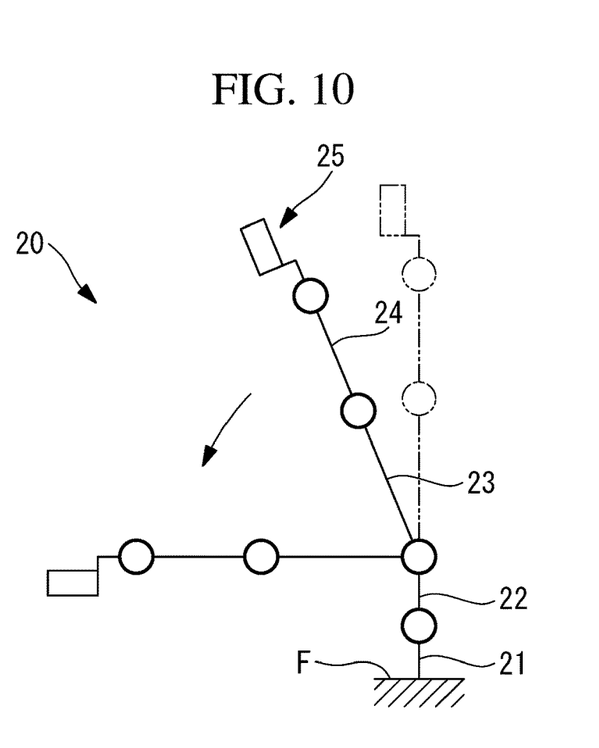
FIG. 10 schematically illustrates an operation where an inertial force and gravity both act on the arms of the robot included in the robot system in FIG. 1.

For example, assuming that the operating environment conditions excluding the load are constant, FIG. 9 illustrates an operation A where gravity does not act on the arms 23 and 24 but an inertial force alone acts on the arms 23 and 24, FIG. 10 illustrates an operation B where an inertial force and gravity both act on the arms 23 and 24, and the operation A and the operation B are repeatedly performed. In this case, the relationship shown in FIG. 11 between time and the amount of bending caused by creep deformation when the operation A alone is performed and the relationship shown in FIG. 12 between time and the amount of bending caused by creep deformation when the operation B alone is performed are stored in the creep-information storage unit 12.

Figure 11:
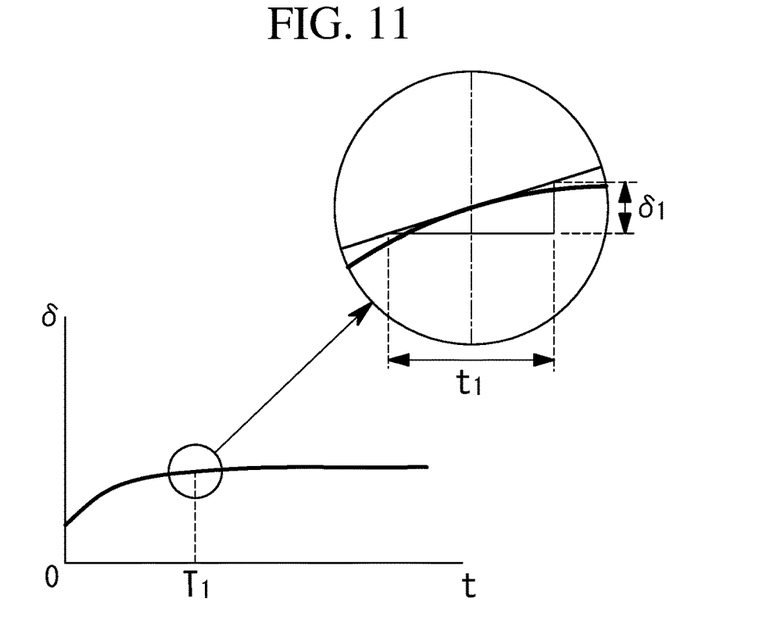
FIG. 11 illustrates the relationship between time and the amount of bending caused by creep deformation in the operation in FIG. 9.

Then, the timer 11 measures a duration time t1 and cumulative time T1 of the operation A, and also measures a duration time t2 and cumulative time T2 of the operation B. When the operation A continues for the duration time t1 and the cumulative time of the operation A reaches T1, a temporal change (gradient) in the amount of bending at the cumulative time T1 in FIG. 11 is read from the creep-information storage unit 12 and is multiplied by the duration time t1.

Consequently, an amount 51 of bending corresponding to the duration time t1 of the operation A is calculated.

Figure 12:
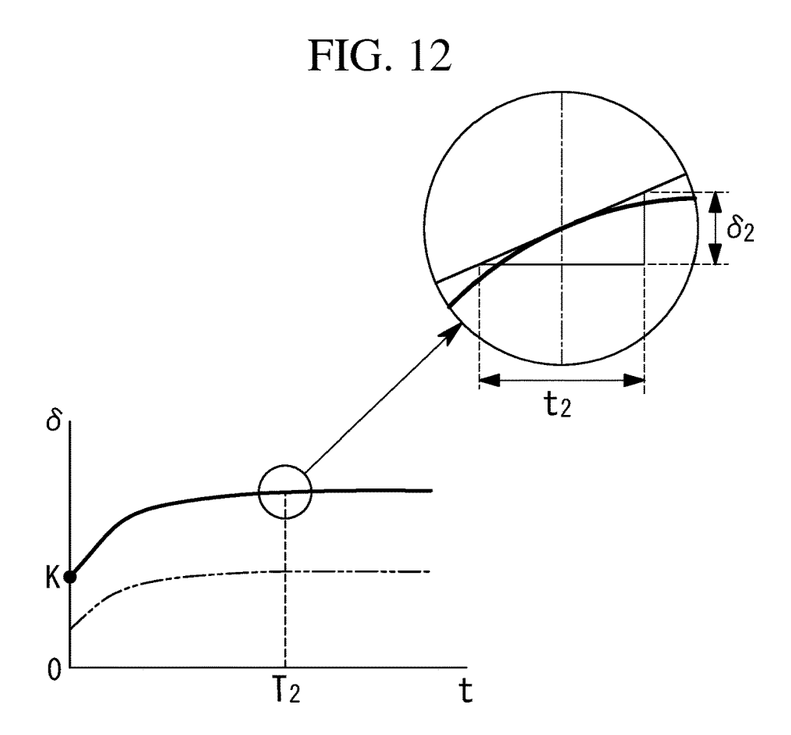
FIG. 12 illustrates the relationship between time and the amount of bending caused by creep deformation in the operation in FIG. 10.
Figure 13:
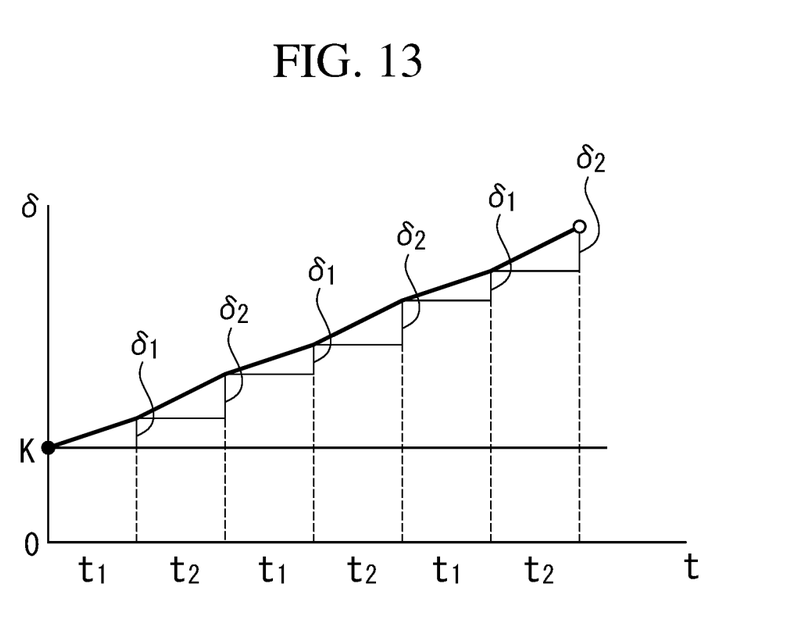
FIG. 13 illustrates a graph obtained by integrating the amounts of bending corresponding to the respective duration times in each of the operations in FIGS. 9 and 10.

When the operation B continues for the duration time t2 and the cumulative time of the operation B reaches T2, a temporal change (gradient) in the amount of bending at the cumulative time T2 in FIG. 12 is read from the creep-information storage unit 12 and is multiplied by the duration time t2. Consequently, an amount 52 of bending corresponding to the duration time t2 of the operation B is calculated. Then, as shown in FIG. 13, the current amount 5 of bending may be calculated by integrating these amounts of bending. In FIG. 12, reference sign K denotes an initial amount of bending.

As an alternative to the above-described case where only the load acting on the robot 20 as an operating environment condition changes, the invention is applicable to a case where another operating environment condition changes or a case where one or more operating environment conditions change.

Furthermore, since the amount of bending caused by creep deformation also changes in accordance with the mass and the center of gravity of the tool S attached to the distal end of the robot 20 and a workpiece held by the tool S or in accordance with the mass and the center of gravity of peripheral devices attached to the arms 23 and 24, the relationship between the elapsed time and the amount of bending may be stored in correspondence with these pieces of load information. The load information may be input by the user, or may be measured in accordance with an electric current value of a motor that drives the second arm 24 or an output from a torque sensor if the second arm 24 is provided with the torque sensor.

Figure 7:
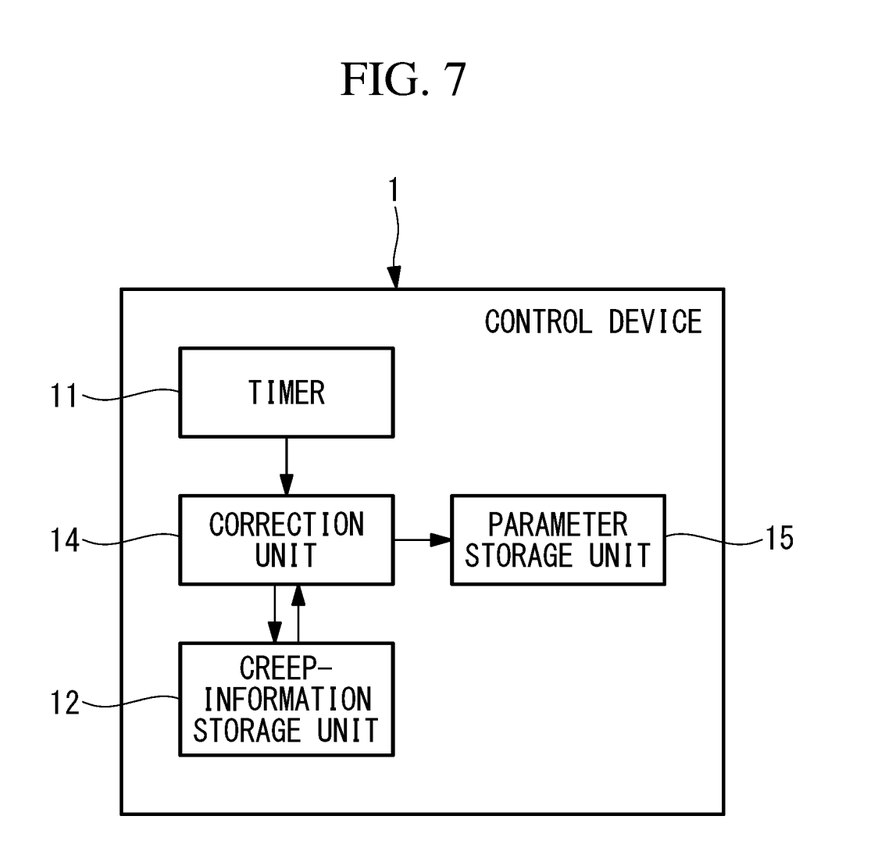
FIG. 7 is a block diagram illustrating a modification of the robot control device in FIG. 2.

As an alternative to or in addition to this embodiment in which the mastering data is corrected on the basis of the amount of bending stored in the creep-information storage unit 12, a parameter storage unit 15 that stores mechanical parameters may be provided, as shown in FIG. 7, and the mechanical parameters may be corrected on the basis of the amount of bending.

An example of a mechanical parameter is a DH parameter that indicates the geometrical status of each link of the robot 20. If all moving shafts of the robot 20 are rotating shafts that cause the links to rotate relatively to each other, a DH parameter for each moving shaft can be used as a mechanical parameter. A DH parameter includes the distance between links, the distance between moving shafts, the angle between links, and the helix angle of each link. It is assumed that the number of mechanical parameters that contribute to an increase in a positioning error is equal to the number of moving shafts of the robot 20.

Figure 8:
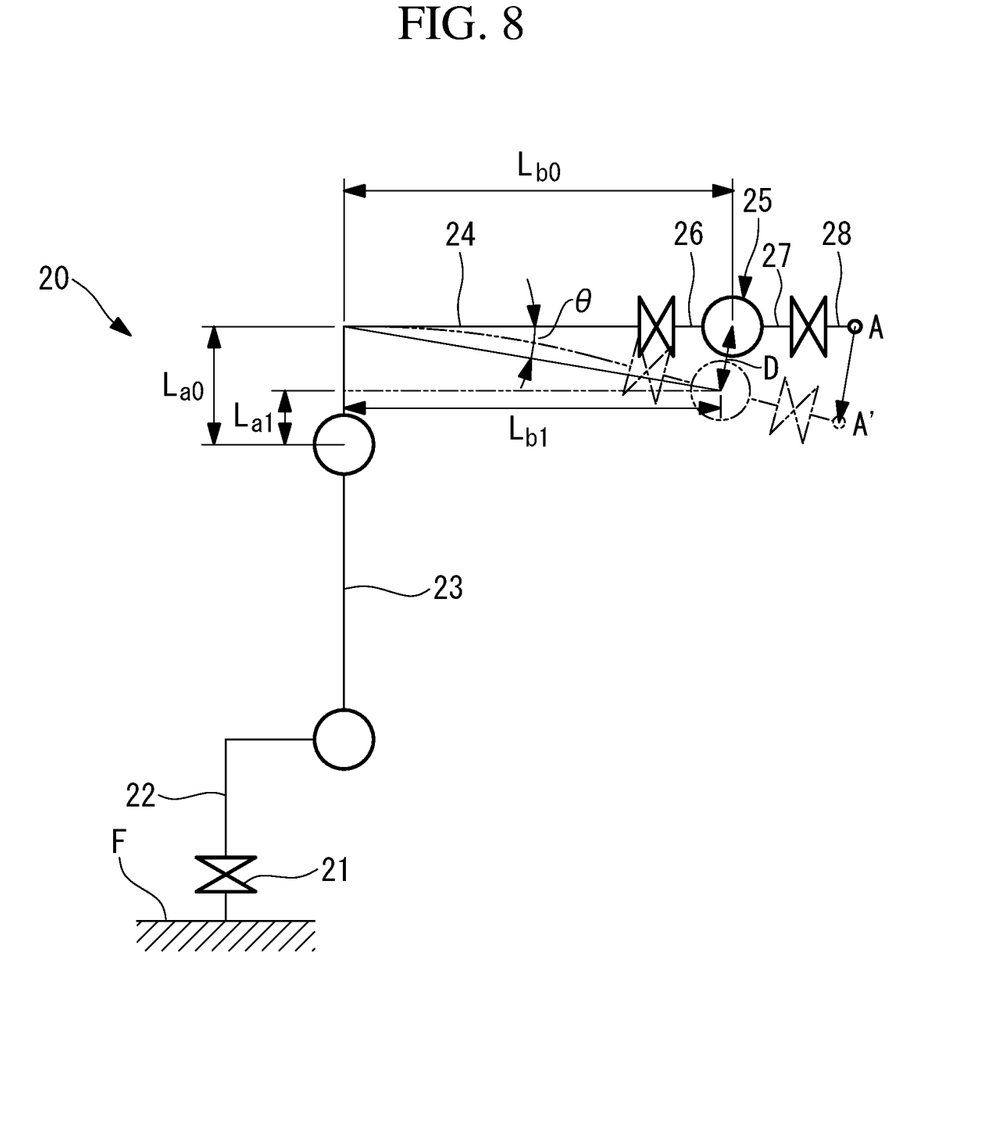
FIG. 8 schematically illustrates an example of mechanical parameters before and after being corrected by the correction unit of the robot control device in FIG. 2.

More specifically, as shown in FIG. 4, if bending caused by creep deformation occurs in the second arm 24 alone, it is regarded that the offset amount of the second arm 24 has changed from $L_{a0}$ to $L_{a1}$ and the length of the second arm 24 has changed from $L_{b0}$ to $L_{b1}$, as shown in FIG. 8.

In this case, if the displacement amount and the displacement angle of the intersection point between the fourth axis and the fifth axis before and after creep deformation are defined as D and θ, respectively, the following approximation expressions can be obtained:

$\theta = \sin^{-1}(D/L_{b0})$ $L_{b1} = L_{b0} \cos\theta$ $L_{a1} = L_{a0} - D$ Therefore, the DH parameter can be corrected to a DH parameter calculated using the length $L_{b1}$ and the offset amount $L_{a1}$ of the second arm 24 after creep deformation. Then, the angle of each moving shaft is determined by performing an inverse-kinematics calculation using the corrected DH parameter, so that the distal end of the tool S, after creep deformation, can be disposed at the same position as that before creep deformation. This is advantageous in that the positional accuracy of the distal end of the tool S can be favorably maintained, even if creep deformation increases, without having to perform mastering again using, for example, a jig.

As another alternative to this embodiment in which the correction of the mastering data or the mechanical parameters is performed on the basis of the amount of bending corresponding to the elapsed time, the mechanical parameters and the mastering data may both be corrected. For example, the changes in the length and the offset amount of the second arm 24 may be dealt with by correcting the DH parameter, as described above, and the angle of the second wrist component 27 relative to the first wrist component 26 in FIG. 5 may be dealt with by correcting the mastering data.

In this embodiment, the second arm 24 that constantly receives a bending moment caused by gravity is described as a representative case where bending caused by creep deformation occurs. In addition, bending caused by creep deformation may similarly be corrected for the first arm 23 if the first arm 23 is in an operating environment where the first arm 23 receives a bending moment in one direction.

If the rotational acceleration or deceleration direction of each moving shaft is biased depending on an operational program, the components of the robot 20 receive a bending moment caused by inertia of the robot 20 and the tool S as a result of continuous execution of such an operational program. Therefore, with regard to such an inertia-based bending moment received by each component of the robot 20, the amount of bending corresponding to the elapsed time may be stored for every magnitude of acceleration or deceleration.

Then, the time during which the first arm 23 and the second arm 24 receive acceleration or deceleration is integrated, and the amount of bending stored in correspondence with the elapsed time is read from the creep-information storage unit 12. Consequently, in a case where creep deformation caused by acceleration or deceleration increases similarly to creep deformation caused by gravity, the positional accuracy of the distal end of the tool S can be favorably maintained by correcting at least one of the mastering data and the mechanical parameter, without having to perform mastering again using, for example, a jig.

The invention claimed is:

1. A robot control device comprising:
    a creep-information storage configured to store, in advance, an amount of bending in correspondence with a cumulative time, the bending occurring in a robot due to creep deformation;
    a mastering-data storage configured to store mastering data of the robot, the mastering data being a value of an encoder of each axis of the robot when the robot is disposed at an origin position;
    a timer configured to measure the cumulative time, the timer being activated when the robot is installed, the cumulative time being an elapsed time from the installation;
    a processor comprising hardware; and
    a parameter storage configured to store a mechanical parameter of the robot, the mechanical parameter indicating a distance between arms, a distance between moving arms, an angle between arms, and a helix angle of each arm, the processor being configured to correct at least one of the mastering data stored in the mastering-data storage and the mechanical parameter stored in the parameter storage based on the amount of bending stored in the creep-information storage in correspondence with the cumulative time measured by the timer, the creep-information storage is further configured to store the amount of bending in correspondence with an operating environment condition of the robot, and the processor is further configured to correct at least one of the mastering data and the mechanical parameter based on the amount of bending stored in the creep-information storage in correspondence with the cumulative time and the operating environment condition.

2. The robot control device according to claim 1, wherein the operating environment condition comprises at least one of a temperature in an operating environment of the robot, humidity in the operating environment, and information about a load acting on the robot.

3. A robot control device comprising:
a creep-information storage configured to store, in advance, an amount of bending in correspondence with a cumulative time, the bending occurring in a robot due to creep deformation;
a mastering-data storage configured to store mastering data of the robot, the mastering data being a value of an encoder of each axis of the robot when the robot is disposed at an origin position;
a timer configured to measure the cumulative time, the timer being activated when the robot is installed, the cumulative time being an elapsed time from the installation;
a processor comprising hardware; and
a parameter storage configured to store a mechanical parameter of the robot, the mechanical parameter indicating a distance between arms, a distance between moving arms, an angle between arms, and a helix angle of each arm, the processor being configured to correct at least one of the mastering data stored in the mastering-data storage and the mechanical parameter stored in the parameter storage based on the amount of bending stored in the creep-information storage in correspondence with the cumulative time measured by the timer, the timer is further configured to measure a duration time and the cumulative time of operation for each operating environment condition, and the processor is further configured to calculate a cumulative amount of bending by integrating the amount of bending calculated based on a temporal change in the amount of bending in the cumulative time measured by the timer and the duration time measured by the timer, and correct at least one of the mastering data and the mechanical parameter based on the calculated cumulative amount of bending.

4. The robot control device according to claim 2, wherein the operating environment condition comprises the temperature in the operating environment of the robot and the humidity in the operating environment.

5. A robot control device comprising:
a creep-information storage configured to store, in advance, an amount of bending in correspondence with a cumulative time, the bending occurring in a robot due to creep deformation;
a mastering-data storage configured to store mastering data of the robot, the mastering data being a value of an encoder of each axis of the robot when the robot is disposed at an origin position;
a timer configured to measure the cumulative time, the timer being activated when the robot is installed, the cumulative time being an elapsed time from the installation;
a processor comprising hardware; and
a parameter storage configured to store a mechanical parameter of the robot, the mechanical parameter indicating a distance between arms, a distance between moving arms, an angle between arms, and a helix angle of each arm, the processor being configured to correct at least one of the mastering data stored in the mastering-data storage and the mechanical parameter stored in the parameter storage based on the amount of bending stored in the creep-information storage in correspondence with the cumulative time measured by the timer, and the processor is further configured to correct the mastering data and the mechanical parameter based on the amount of bending stored in the creep-information storage in correspondence with the cumulative time measured by the timer.

6. The robot control device according to claim 1, wherein the processor is further configured to correct the mastering data and the mechanical parameter based on the amount of bending stored in the creep-information storage in correspondence with the cumulative time measured by the timer.

* * * * *